US012661928B2

(12) United States Patent
Van Ryn et al.

(10) Patent No.: US 12,661,928 B2
(45) Date of Patent: Jun. 23, 2026

(54) UNIVERSAL AERODYNAMIC WHEEL COVER

(71) Applicant: Wheel Pros, LLC, Greenwood Village, CO (US)

(72) Inventors: Tom Van Ryn, Phoenix, AZ (US); Ronald Baugh, Irvine, CA (US); Steven Kern, Irvine, CA (US); Yuri Ranum, Irvine, CA (US)

(73) Assignee: Wheel Pros, LLC, Greenwood Village, CO (US)

( * ) Notice: Subject to any disclaimer, the term of this patent is extended or adjusted under 35 U.S.C. 154(b) by 438 days.

(21) Appl. No.: 18/108,418

(22) Filed: Feb. 10, 2023

(65) Prior Publication Data

US 2023/0256775 A1     Aug. 17, 2023

Related U.S. Application Data

(60) Provisional application No. 63/309,327, filed on Feb. 11, 2022.

(51) Int. Cl.
| | |
|---|---|
| *B60B 7/16* | (2006.01) |
| *B60B 7/04* | (2006.01) |
| *B60B 7/06* | (2006.01) |
| *B60B 7/10* | (2006.01) |

(52) U.S. Cl.
CPC .................. B60B 7/16 (2013.01); B60B 7/04 (2013.01); B60B 7/065 (2013.01); B60B 7/10 (2013.01); *B60B 2360/32* (2013.01); *B60B 2900/1216* (2013.01); *B60B 2900/325* (2013.01)

(58) Field of Classification Search
CPC ........... B60B 7/04; B60B 7/065; B60B 7/066; B60B 7/08; B60B 7/10; B60B 7/16
See application file for complete search history.

(56) References Cited

U.S. PATENT DOCUMENTS

| | | | | |
|---|---|---|---|---|
| 6,428,112 | B1 * | 8/2002 | Passoth ..................... | B60B 7/02 |
| | | | | 301/37.42 |
| 6,779,852 | B2 * | 8/2004 | Van Houten ............ | B60B 7/006 |
| | | | | 301/37.11 |
| 7,204,562 | B2 * | 4/2007 | Gerard .................. | B60B 7/0013 |
| | | | | 301/37.11 |
| 7,416,260 | B1 * | 8/2008 | Cuevas ..................... | B60B 7/08 |
| | | | | 301/37.11 |
| 10,202,000 | B2 * | 2/2019 | Lim .......................... | B60B 7/04 |
| 11,021,011 | B2 * | 6/2021 | Ravelo .................... | B60B 3/004 |
| 11,440,344 | B2 * | 9/2022 | Ivarsson ................. | B60B 7/066 |
| 11,584,157 | B2 * | 2/2023 | Harasym ................. | B60B 7/066 |
| 11,787,230 | B2 * | 10/2023 | Tataru ..................... | B60B 7/066 |
| | | | | 301/37.26 |
| 12,115,815 | B2 * | 10/2024 | Wang .................... | B60B 7/0013 |
| 2016/0229227 | A1 * | 8/2016 | Luo ........................ | B60B 7/0013 |
| 2018/0319209 | A1 * | 11/2018 | Chung ..................... | B60B 7/04 |
| 2022/0016927 | A1 * | 1/2022 | Liao ........................ | B60B 7/066 |

* cited by examiner

*Primary Examiner* — Jason R Bellinger
(74) *Attorney, Agent, or Firm* — Womble Bond Dickinson (US) LLP

(57)     ABSTRACT

An adapter assembly that allows a wheel cover to be attached to a wheel has an insert, a plug, a key and a wrench. The insert attaches through a hole in the wheel cover and has prongs that lock behind a cap lip of the wheel. The plug is screwed into the insert via the wrench, and plug threads push out on the prongs, securing them behind the cap lip. The key is inserted into a locking space between the outer surface of the plug and the inner surface of the insert.

19 Claims, 10 Drawing Sheets

UNIVERSAL AERODYNAMIC WHEEL COVER

CROSS REFERENCE TO RELATED APPLICATIONS

This application claims priority to U.S. Provisional No. 63/309,327, filed Feb. 11, 2022, the contents of which are incorporated by reference.

STATEMENT REGARDING FEDERALLY SPONSORED RESEARCH OR DEVELOPMENT

This invention was not federally sponsored.

INVENTORS: Tom Van Ryn, Ronald Baugh, Steven Kern, Yuri Ranum, Van Ryn is a resident of Phoenix, AZ and Baugh, Kern and Ranum are residents of Irvine, CA, with all inventors being citizens of USA.

BACKGROUND OF THE INVENTION

Field of the invention: This invention relates to the general field of attachment devices, and more specifically to a universal adaptor that can be used to securely attach an aerodynamic wheel cover to an automobile wheel.

Brief Description of Invention. The present invention is a multi-part assembly that has an insert with prongs that grip the cap lip of a wheel, a threaded plug that threads into the insert, pushing the prongs outward to secure the device to the wheel. The plug is screwed into the insert by a wrench, which pushes out on the prongs to secure prong catches behind the cap lip. A key is inserted into aligned cavities in the inside of the upper portion of the insert and the outside of the plug, preventing the plug from "unscrewing itself" as the wheel bounces over surface irregularities in the rod.

Statement of the Problem. Automobile wheels are not perfectly aerodynamic. Wheel covers that are considerably more aerodynamic than the average automobile wheel provide better gas mileage and can be more attractive than the wheel, but are difficult to install and keep from getting stolen. Wheel covers are compatible only with specific base wheels that were intended for that purpose and are either difficult to install and remove or fall off and/or are stolen easily. This system solves this problem by allowing covers to be designed for universal compatibility with multiple different base wheels, including wheels that were never intended for compatibility with a wheel cover.

The current invention provides a solution by having a combination of an insert, a plug, a wrench and a key, where the insert secures the wheel cover against the wheel as several prongs on the bottom end of the insert fit over the cap lip of the wheel. The inside of the bottom portion of the insert is threaded, such that the plug, which has threads on its lower, outside surface, can "screw into" the insert. The prongs are pushed out as the plug is screwed further and further into the insert. At the end of the prongs are prong catches, which snap over the cap lip and secure the insert to the wheel. On the upper, outside section of the plug are a series of protrusions, which mate with wrench teeth on the inside of the wrench, such that the plug can be rotated in and out of the insert by the wrench.

On the inside of the upper portion of the insert is a small cavity for the key. On the outside of the plug are several key cavities. As the plug is screwed into the insert, the prongs are pressed outward. Once this has been accomplished, the insert key cavity is lined up with one of the plug key cavities, and the key is pushed into the resulting opening. This prevents the plug from rotating any further. This is important as wheels undergo considerable jarring as they drive over roads, particularly bumpy roads. Without the key, the plug would gradually work itself free of the insert, thereby removing the outward pressure on the prongs. This could easily lead to the wheel cover becoming disconnected from wheel as the vehicle is being driven.

There has thus been outlined, rather broadly, the more important features of the invention in order that the detailed description thereof may be better understood, and in order that the present contribution to the art may be better appreciated. There are additional features of the invention that will be described hereinafter, and which will form the subject matter of the claims appended hereto. The features listed herein, and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

It should be understood the while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

BRIEF DESCRIPTION OF THE FIGURES

One preferred form of the invention will now be described with reference to the accompanying drawings.

DETAILED DESCRIPTION OF THE FIGURES

Figure 1:
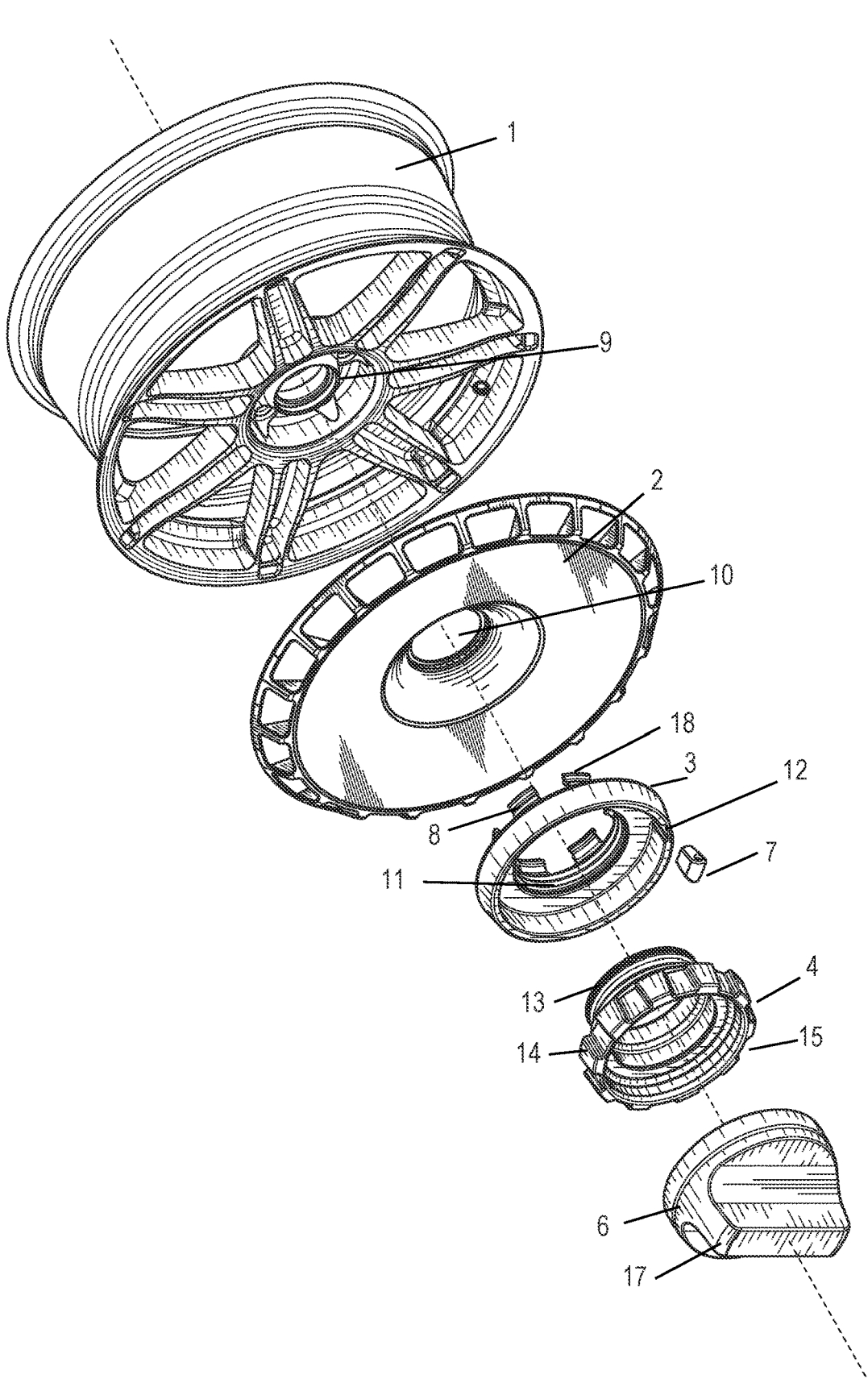
FIG. 1 is an exploded, perspective view of several of the main components of the invention.

FIG. 1 is an exploded, perspective view of several of the main components of the invention. A wheel 1 has a cap lip 9 over which prongs 8 of an insert 3 fit. The prong catches 18 secure the insert 3 to the wheel 1, and holds the aero disc 2 in place over the wheel 1. The insert 3 has prongs 8 at its bottom, and a circular top with an insert key cavity 12 on the inside of its top. At the bottom of the insert 3 are insert threads 11. The plug 4 has a circular top section with protrusions 14 that define plug key cavities 15, and a bottom section with plug threads 13. A wrench 6 is used to screw the plug 4 into the insert 3. As the plug 4 is screwed into the insert 3, the plug threads 13 push out on the prongs 8 of the insert 3, forcing the prong catch 18 to "grab" the cap lip 9. The wrench is used to rotate the plug until the prong catches have been pushed outward, and where the insert key cavity 12 is lined up with one of the plug key cavities 15, at which point the key 7 is inserted. This locks the plug and prevents it from rotating out of the insert. This is important to the function of the invention as driving over roads, particularly bumpy roads, causes a lot of jarring to the wheels. Without the key, the plug would slowly but surely wiggle its way out of the insert, and without the outward pressure on the prongs, the wheel cover would likely fall off the wheel.

Figure 2:
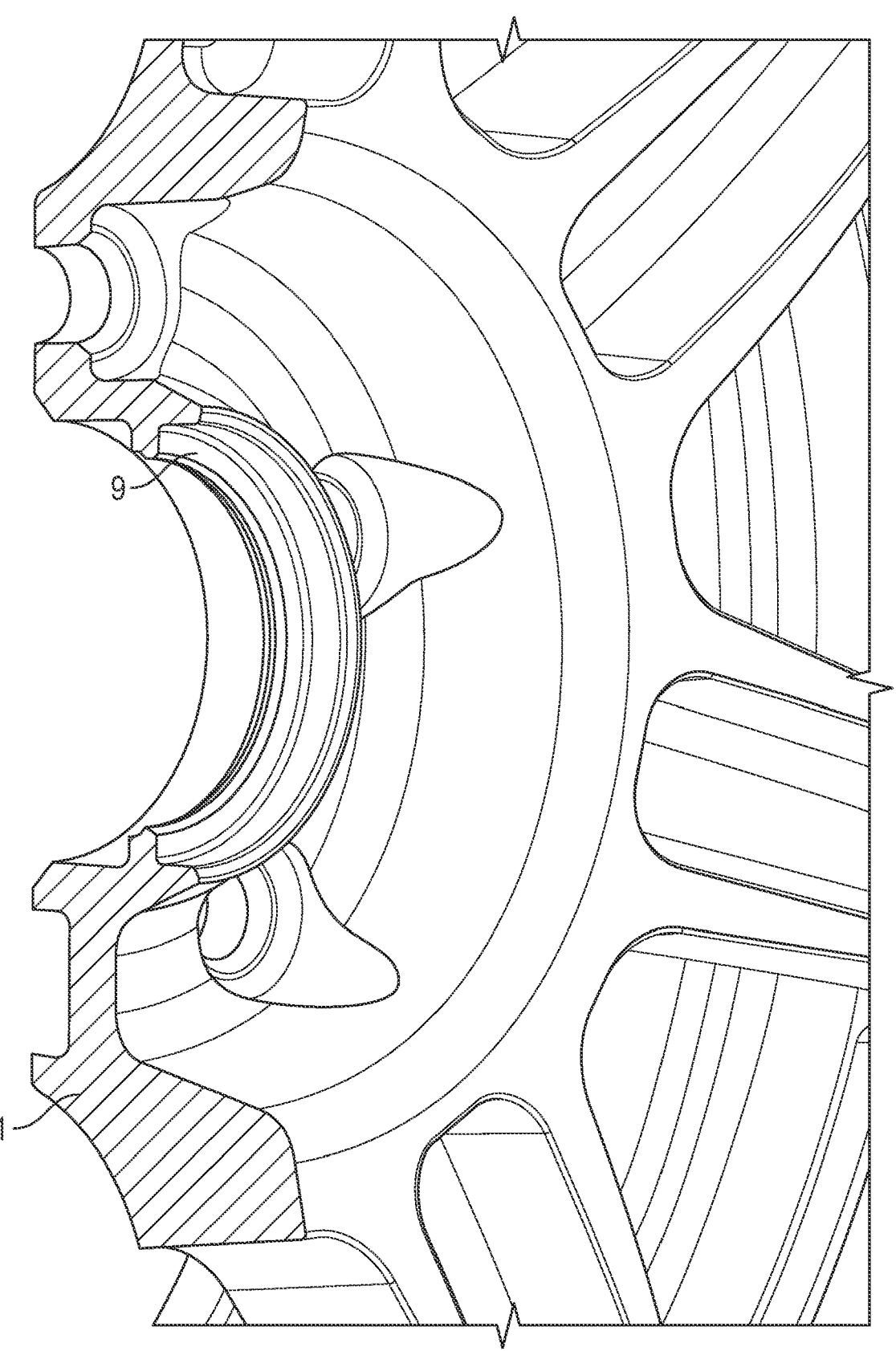
FIG. 2 is a perspective view of a vehicle wheel, showing the cap lip upon which the invention is secured.

FIG. 2 is a perspective view of a vehicle wheel, showing the cap lip 9 upon which the invention is secured. The prongs (8 in other figures) have prong catches (18 in other figures) that are pushed out and behind the cap lip 9, thereby securing the wheel cover over the front face of the wheel.

Figure 3:
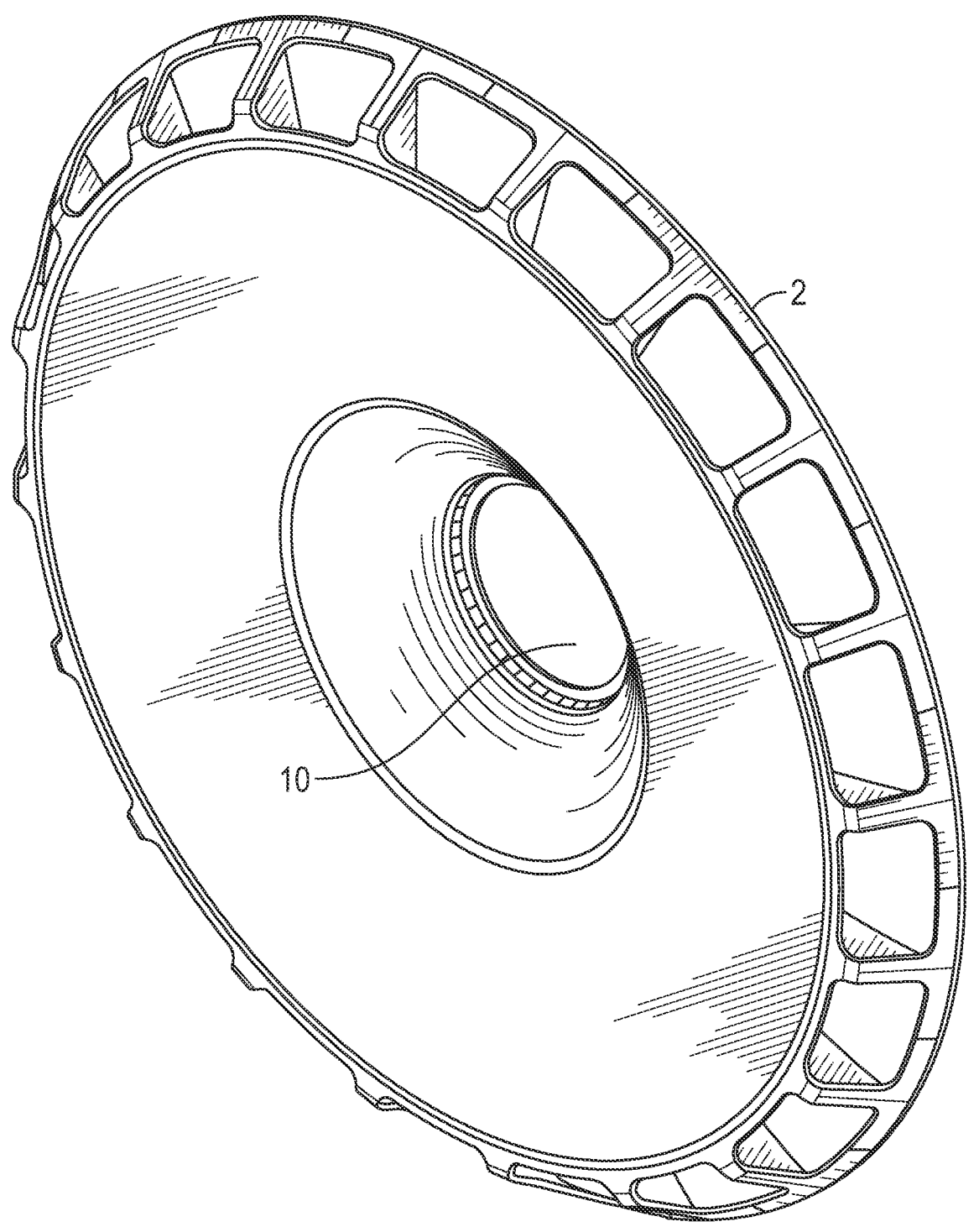
FIG. 3 is a front, perspective view of a wheel cover.

FIG. 3 is a front, perspective view of a wheel cover. The wheel cover, generally 2, has a hole 10, through with the insert (3 in other figures) is inserted.

Figure 4:
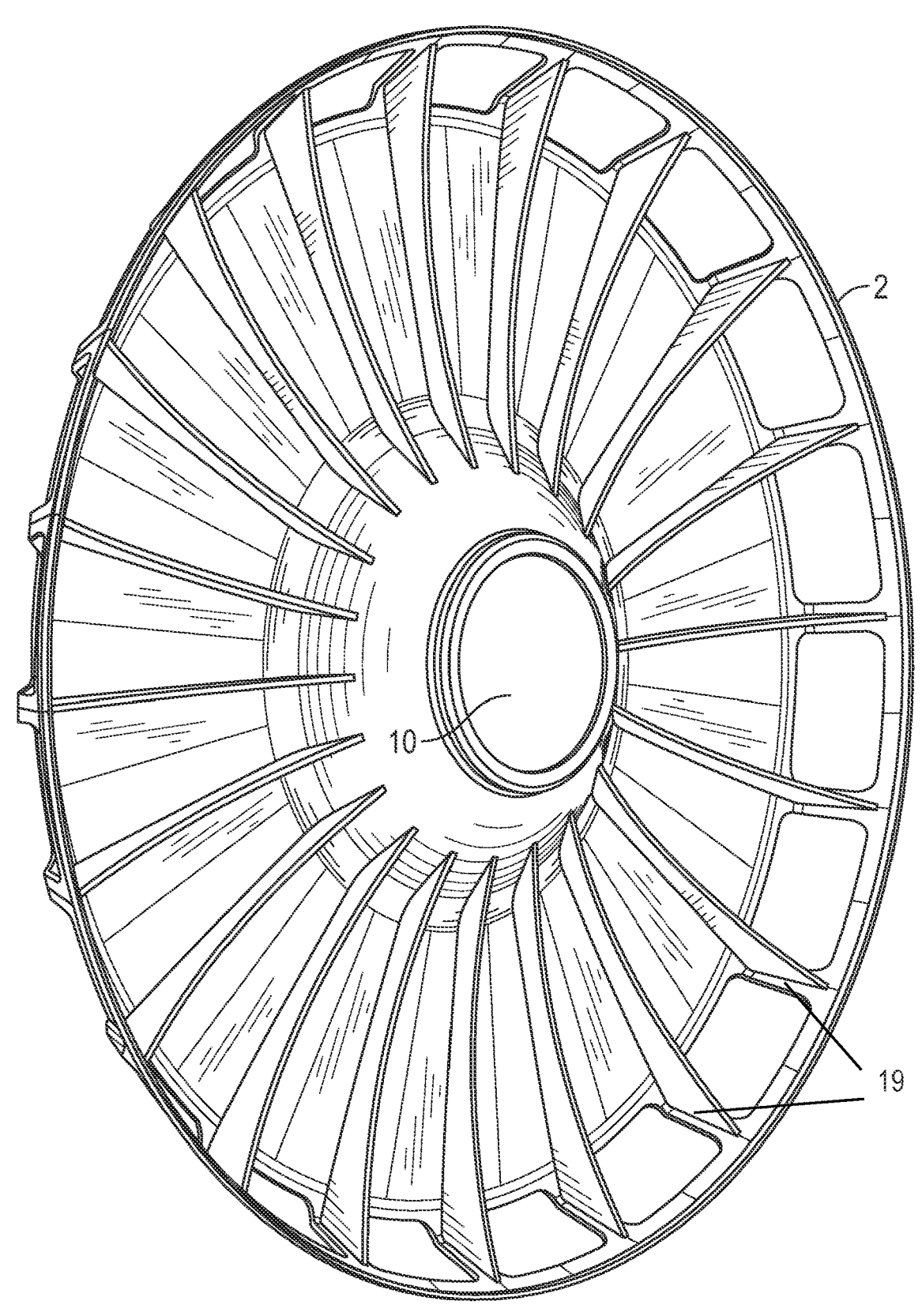
FIG. 4 is a back, perspective view of a wheel cover.

FIG. 4 is a back, perspective view of a wheel cover. This figure shows the supportive ridges 19 on the back of the wheel cover 2, which rest against the spokes of the wheel and provide support for the wheel cover.

Figure 5:
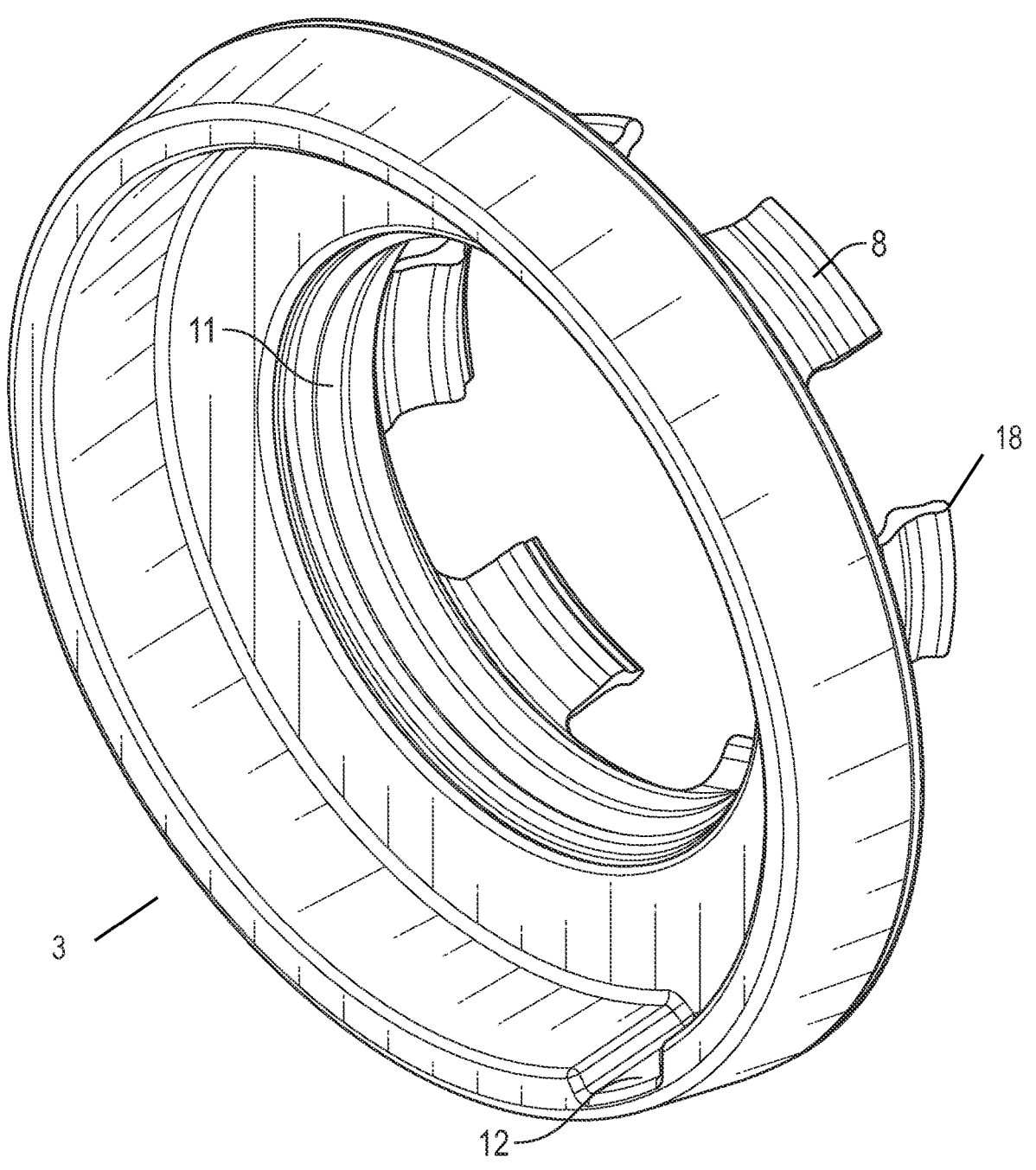
FIG. 5 is a perspective view of an insert.
Figure 6:
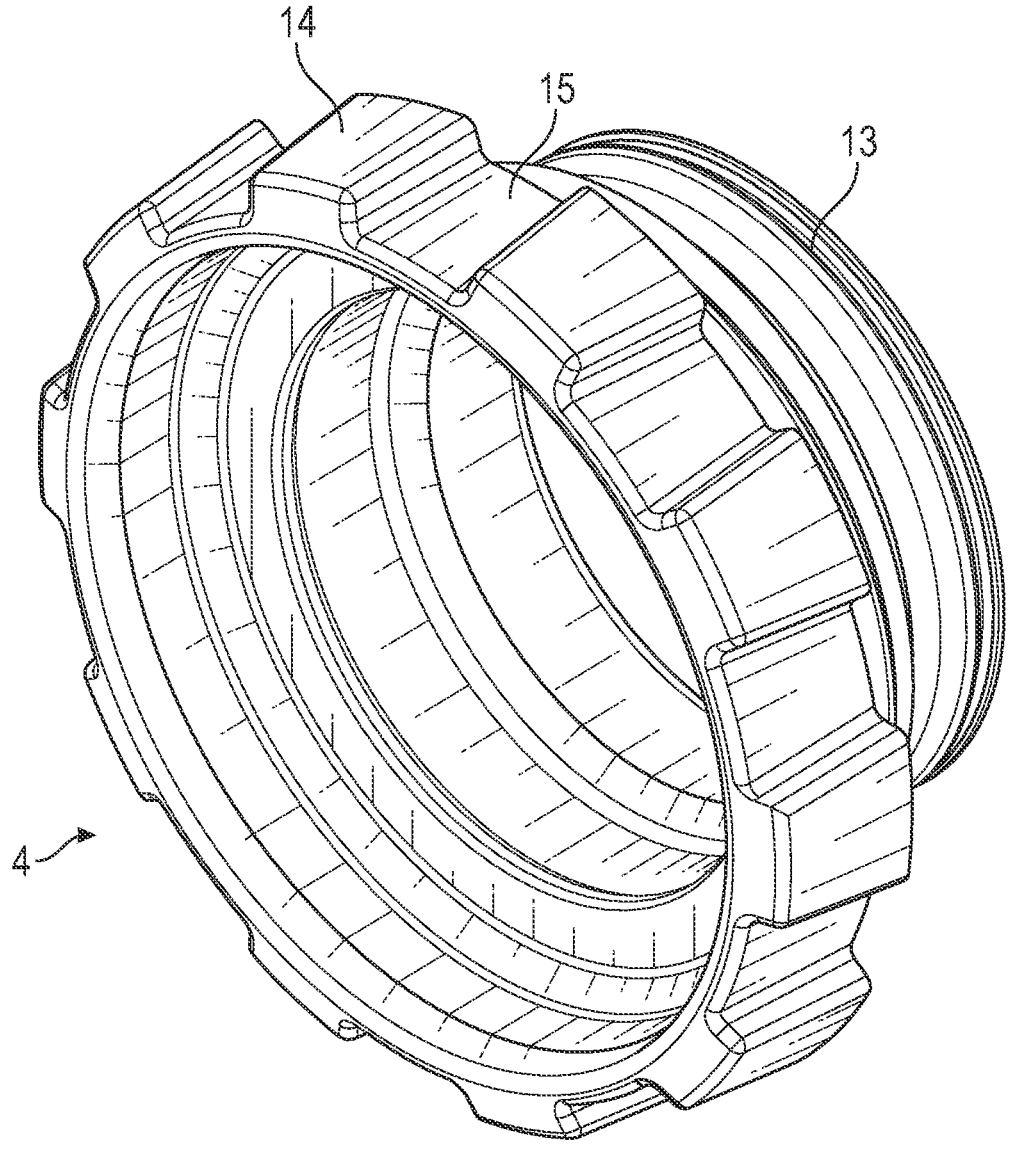
FIG. 6 is a perspective view of a plug

FIG. 5 is a perspective view of an insert. The insert, generally 3, has a circular upper portion that has an insert key cavity 12 on its inside. This insert key cavity 12 will be lined up with a corresponding plug key cavity on the plug, and rotation of the plug "out" of the insert will be prevented by insertion of the key. At the bottom of the insert are prongs 8. At the end of each prong is a prong catch 18, which is the portion of the prong that slides behind the cap lip on the wheel. On the inside of the lower portion of the insert are insert threads 11. These insert threads mate with plug threads, such that the plug (4 in other figures) can be screwed into the insert, with the plug then applying outward pressure to push the prongs 6 out and hook the prong catches 18 over the cap lip FIG. 6 is a perspective view of a plug. The plug, generally 4, has an upper section that is circular, and on its outer surface are a series of protrusions 14, which define plug key cavities 15. The insert key cavity (12 in other figures), is lined up with one of these plug key cavities to create a space for the key to be inserted, thereby preventing the plug from unscrewing itself during a bumpy ride. At the bottom end of the plug are plug threads 13. The plug threads mate with the insert threads, so that as the plug is inserted into the insert, the threads mate and the plug can be screwed into the insert. As the plug threads 13 are inserted further and further into the insert threads, the prongs on the insert are pushed out and the prong catches hook around the back of the cap lip.

Figure 7:
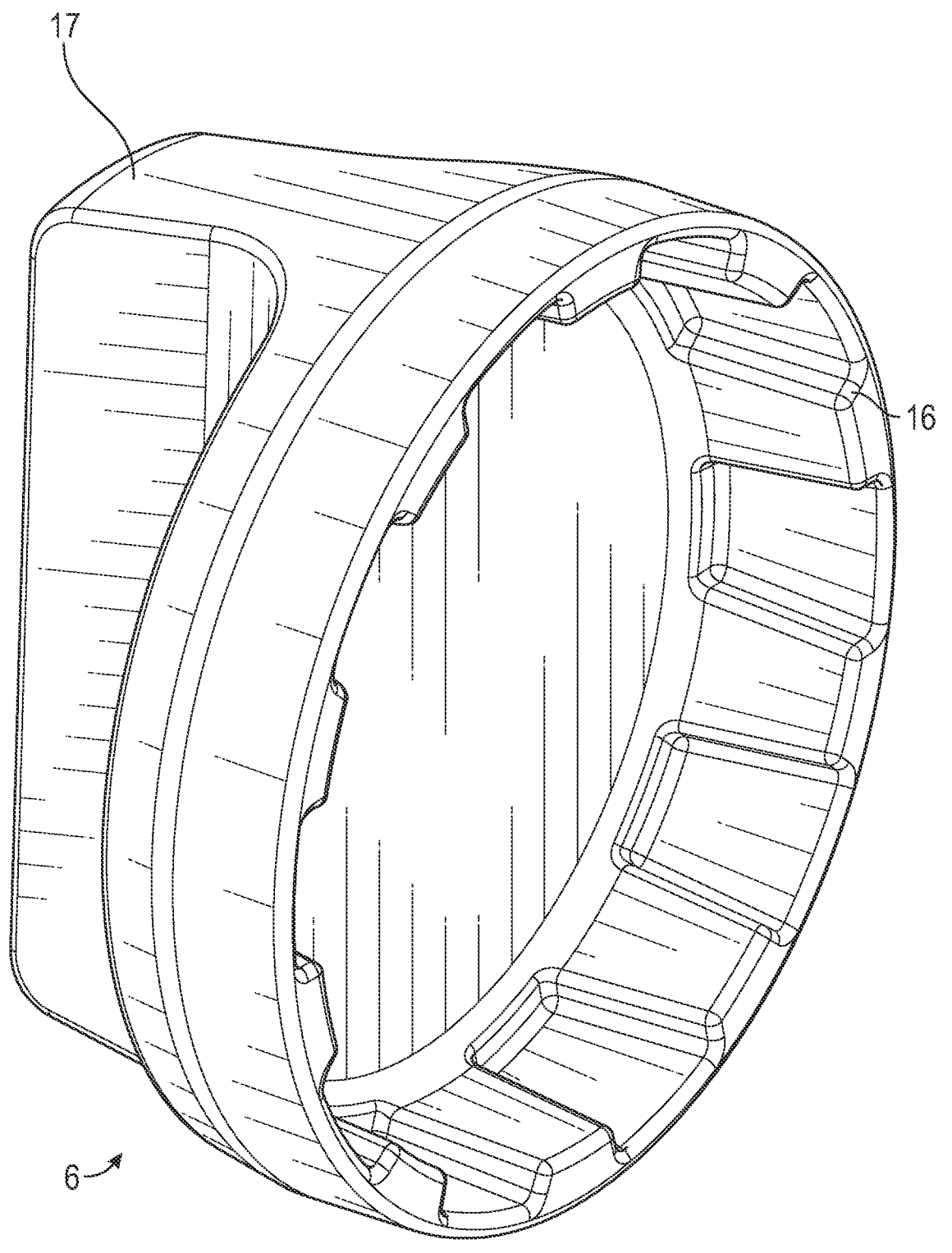
FIG. 7 is a front, perspective view of a wrench.

FIG. 7 is a front, perspective view of a wrench. The wrench, generally 6, has a wrench knob 17 by which a user can grasp the wrench to rotate it, and wrench teeth 16 on the inside of the wrench. The wrench teeth mate with the protrusions on the outer surface of the plug, allowing a user to screw the plug into the insert using the wrench.

Figure 8:
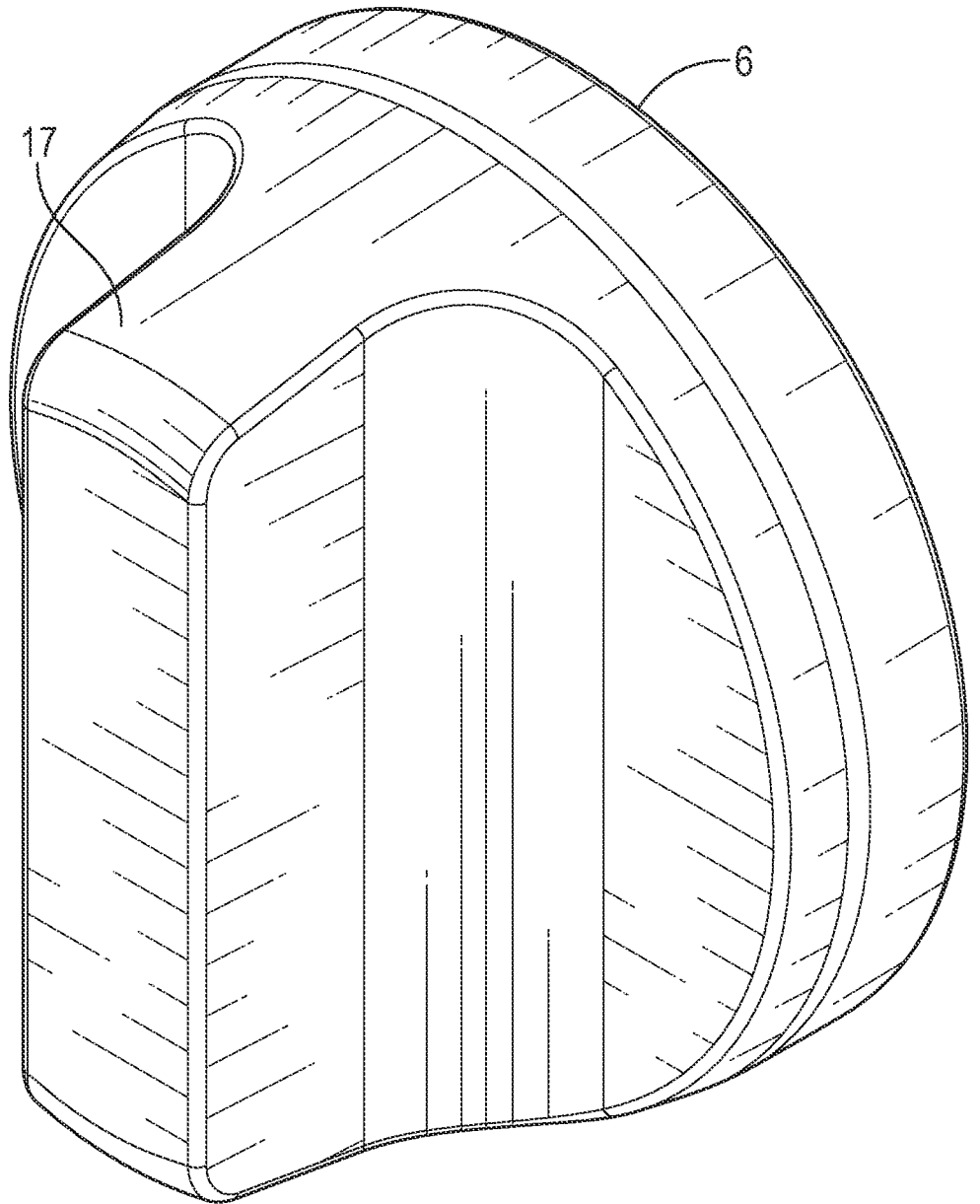
FIG. 8 is a back, perspective view of a wrench.

FIG. 8 is a back, perspective view of a wrench, showing the wrench knob 17 from a different perspective.

Figure 9:
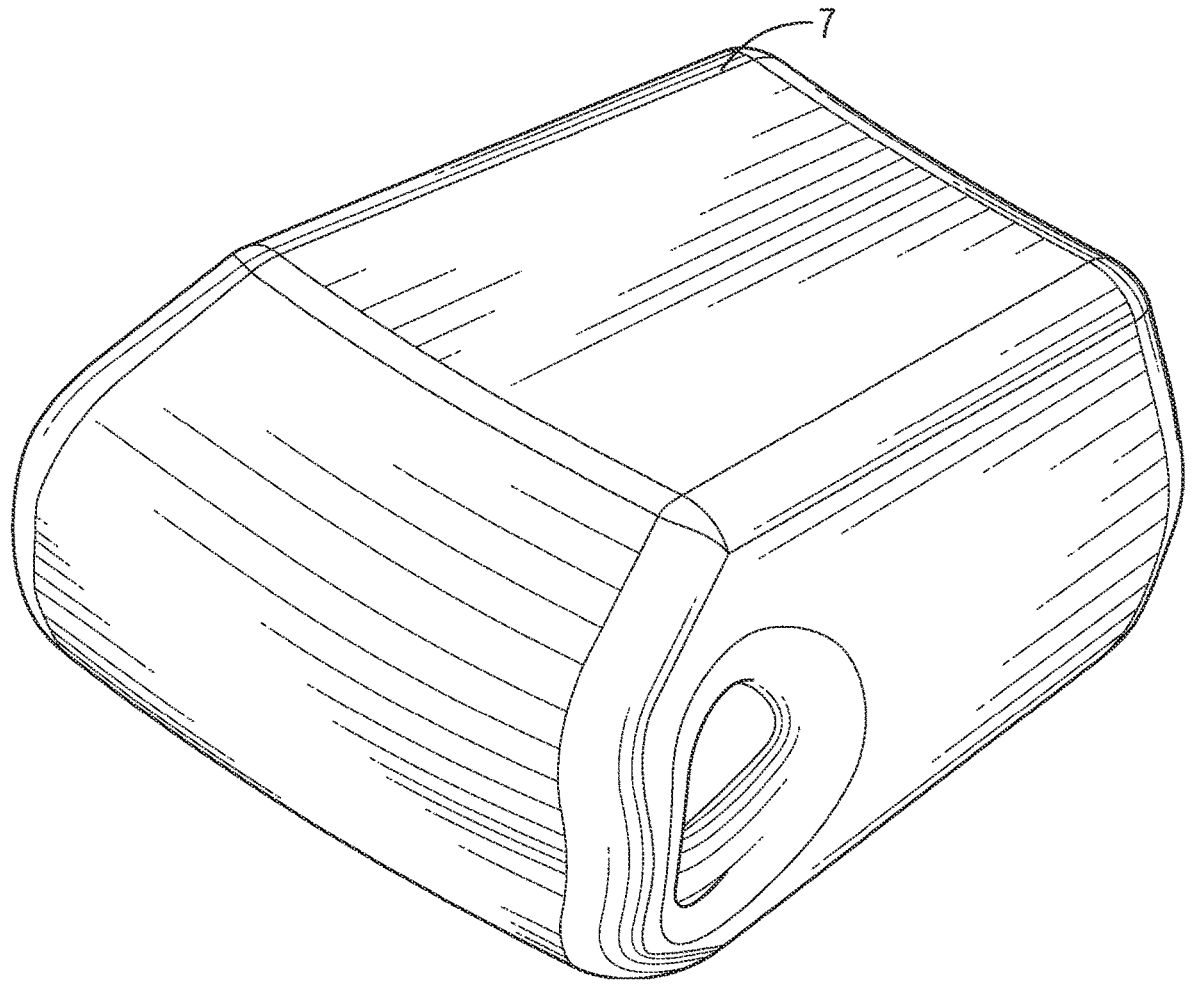
FIG. 9 is a perspective view of a key.

FIG. 9 is a perspective view of a key. The key, generally 7, is inserted into a space created by lining up the insert key cavity with one of the plug key cavities. This "locks" the plug into the key and prevents the plug from loosening. This is important as a wheel goes through considerable stress while driving, particularly on bumpy roads, and without the key, it is likely that the plug would gradually "wiggle it's way out" of the insert, resulting in potential loss of the wheel cover.

Figure 10:
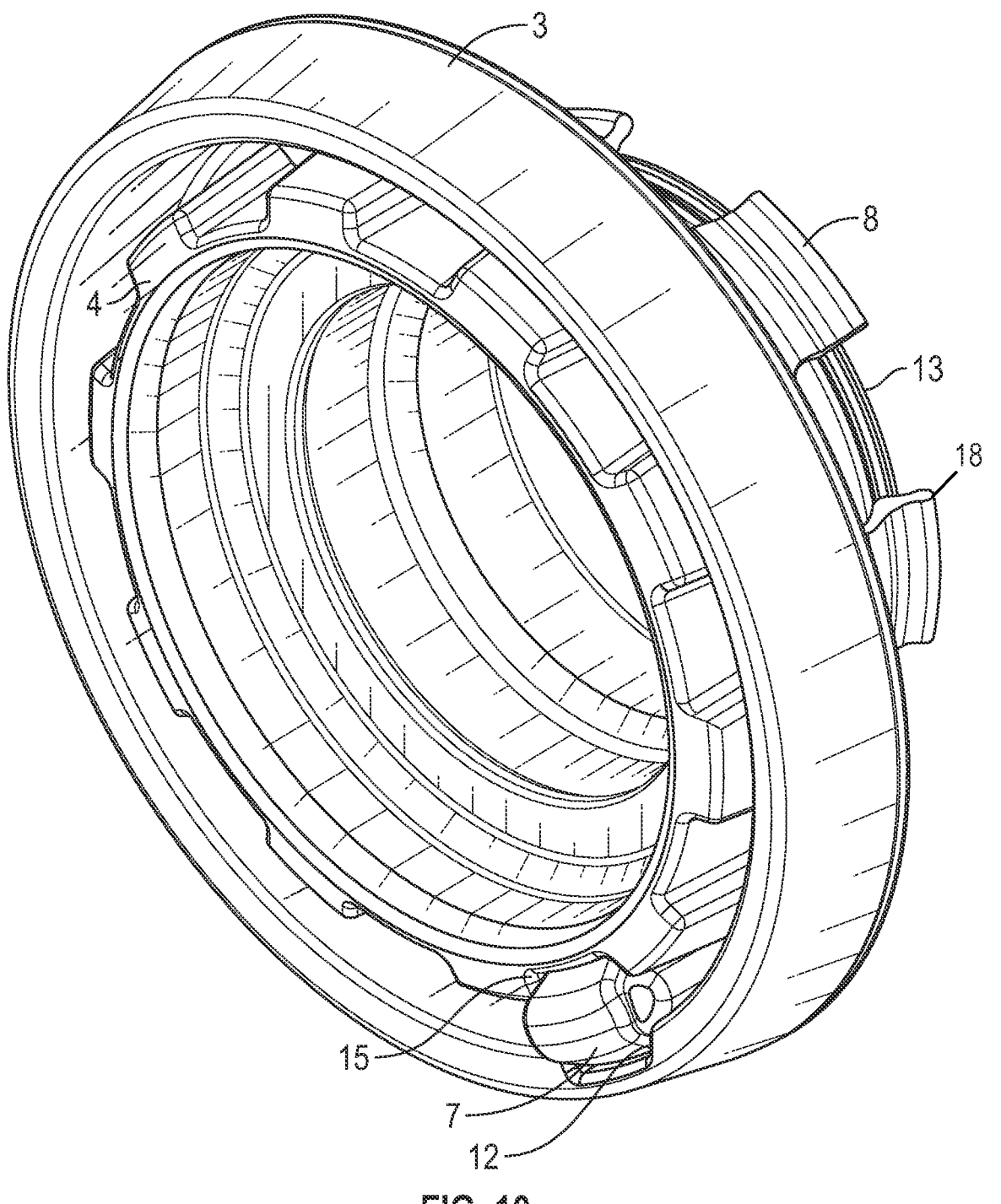
FIG. 10 is a perspective view of the insert, plug and key in attached mode.

FIG. 10 is a perspective view of the insert, plug and key in attached mode. The assembly, generally 5, shows how the insert 3, plug 4 and key 7 appear when the unit has been fully assembled. The plug threads 13 have pushed out on the prongs 8. The insert key cavity 12 has been aligned with one of the plug key cavities 15, and the key 7 has been inserted.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention.

Many aspects of the invention can be better understood with references made to the drawings below. The components in the drawings are not necessarily drawn to scale. Instead, emphasis is placed upon clearly illustrating the components of the present invention. Moreover, like reference numerals designate corresponding parts through the several views in the drawings. Before explaining at least one embodiment of the invention, it is to be understood that the embodiments of the invention are not limited in their application to the details of construction and to the arrangement of the components set forth in the following description or illustrated in the drawings. The embodiments of the invention are capable of being practiced and carried out in various ways. In addition, the phraseology and terminology employed herein are for the purpose of description and should not be regarded as limiting.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

What we claim is:

1. A device for removably attaching a cover to a vehicle wheel, consisting of an insert, a plug, a key and a wrench, where the insert consists of a circular upper insert section which has an insert key cavity on an inner circular upper insert face, and a bottom insert portion which has a plurality of prongs extending therefrom, where each prong has a prong catch, and a plurality of insert threads on an insert bottom inner surface, where the cover has a hole in a cover central location, where the plurality of prongs on the insert are insertable through the hole, where each of the prong catches is snapped over a cap lip of the vehicle wheel, where the plug has a plug upper portion which comprises an upper circular exterior portion with a plurality of protrusions, where the plurality of protrusions define a plurality of plug key cavities, and a lower plug portion with a plurality of plug threads on a lower plug outer side, where the wrench consists of a wrench upper end, which comprises a wrench knob, and a wrench bottom end, where the wrench bottom end consists of a wrench circular bottom where the wrench circular bottom has a wrench inner surface, where the wrench inner surface has a plurality of wrench teeth, where the plurality of wrench teeth mate with the plurality of protrusions on the plug, such that the wrench fits over the plug upper portion and rotates the plug, where, the plug threads mate with the insert threads, such that as the wrench is turned, the plug is inserted into the insert, where the lower plug portion pushes in an outward direction on the prongs of the insert, forcing the prong catches behind the cap lip, where insert key cavity is lined up with one of the plug key cavities, and where the key is inserted in a key opening, where the key opening consists of the insert key cavity and one of the plug key cavities, thereby preventing the plug from rotating within the insert.

2. A wheel cover assembly, comprising an insert and a wheel cover, where the insert comprises a bottom insert portion which has a plurality of prongs extending therefrom, where each prong has a prong catch, where the cover has a hole in a cover central location, where the plurality of prongs on the insert are insertable through the hole, where the plurality of prongs snap over a cap lip of a vehicle wheel, with each of the prong catches fitting behind the cap lip, thereby removably retaining the vehicle wheel cover on the vehicle wheel, where the insert comprises a circular upper insert section which has an insert key cavity on an inner circular upper insert face and a plurality of insert threads on an insert bottom inner surface.

3. The assembly of claim 2, additionally comprising a plug, where the plug has a plug upper portion which comprises an upper circular exterior portion with a plurality of protrusions, where the plurality of protrusions define plurality of plug key cavities, and a lower plug portion with a plurality of plug threads on a lower plug outer side.

4. The assembly of claim 3, additionally comprising a wrench, where the wrench comprises a wrench knob on a wrench upper end, and a wrench bottom end, where the wrench bottom end comprises a wrench circular bottom where the wrench circular bottom has a wrench inner surface, where the wrench inner surface has a plurality of wrench teeth, where the plurality of wrench teeth mate with the plurality of protrusions on the plug, such that the wrench fits over the plug upper portion and rotates the plug.

5. The assembly of claim 4, where the plug threads mate with the insert threads, such that as the wrench is turned, the plug is inserted into the insert, where the lower plug portion pushes in an outward direction on the prongs of the insert, forcing each of the prong catches behind the cap lip.

6. The assembly of claim 5, additionally comprising a key, where the insert key cavity is lined up with one of the plug key cavities, and where the key is inserted in a key opening, where the key opening comprises the insert key cavity and one of the plug key cavities, thereby preventing the plug from rotating within the insert.

7. The assembly of claim 6, where the wheel cover is an aerodynamic wheel cover.

8. The assembly of claim 2, where the insert comprises a circular upper insert section which has a insert key cavity on an inner circular upper insert face and a plurality of insert threads on an insert bottom inner surface, additionally comprising a plug, where the plug has a plug upper portion which comprises an upper circular exterior portion with a plurality of protrusions, where the plurality of protrusions define a plurality of plug key cavities, and a lower plug portion with a plurality of plug threads on a lower plug outer side.

9. The assembly of claim 8, where the plug threads mate with the insert threads, such that as the plug is inserted into the insert, where the lower plug portion pushes in an outward direction on the prongs of the insert, forcing each of the prong catches behind the cap lip.

10. The assembly of claim 9, additionally comprising a key, where the insert key cavity is lined up with one of the plug key cavities, and where the key is inserted in a key opening, where the key opening comprises the insert key cavity and one of the plug key cavities, thereby preventing the plug from rotating within the insert.

11. The assembly of claim 10, additionally comprising a wrench, where the wrench comprises a wrench knob on a wrench upper end and a wrench bottom end, where the wrench bottom end comprises a wrench circular bottom where the wrench circular bottom portion has a wrench inner surface, where the wrench inner surface has a plurality of wrench teeth, where the plurality of wrench teeth mate with the plurality of protrusions on the plug, such that the wrench fits over the plug upper portion and rotates the plug.

12. The assembly of claim 8, where the wheel cover is an aerodynamic wheel cover.

13. A method for removably attaching a wheel cover to a vehicle wheel, where the method comprises a first step of obtaining a wheel cover and an insert, and a second step of using the insert to secure the wheel cover to the vehicle wheel by inserting the insert through a hole in the wheel cover, where the insert consists of a circular upper insert section which has a insert key cavity on an inner circular upper insert face, and a bottom insert portion which has a plurality of prongs extending therefrom, where each prong has a prong catch, and a plurality of insert threads on an insert bottom inner surface, where the cover has the hole in a cover central location, where the plurality of prongs on the insert are insertable through the hole, where each of the prong catches are snapped over a cap lip of the vehicle wheel.

14. The method of claim 13, additionally comprising a third step of obtaining a plug, and using the plug to secure the insert in the vehicle wheel, where the plug has a plug upper portion which comprises an upper circular exterior portion with a plurality of protrusions, where the plurality of protrusions define a plurality of plug key cavities, and a lower plug portion with a plurality of plug threads on a lower plug outer side, where, the plug threads mate with the insert threads, such that as a wrench is turned, the plug is inserted into the insert, where the lower plug portion pushes in an outward direction on the prongs of the insert, forcing each of the prong catches behind the cap lip.

15. The method of claim 14, additionally comprising a fourth step of obtaining the wrench, and using the wrench to screw the plug into the insert, where the wrench consists of a wrench knob on a wrench upper end and a wrench bottom end, where the wrench bottom end consists of a wrench circular bottom where the wrench circular bottom portion has a wrench inner surface, where the wrench inner surface has a plurality of wrench teeth, where the plurality of wrench teeth mate with the plurality of protrusions on the plug, such that the wrench fits over the plug upper portion and rotates the plug.

16. The method of claim 15, additionally comprising a fifth step of obtaining a key, and using the key to lock the plug into the insert, where the insert key cavity is lined up with one of the plug key cavities, and where the key is inserted in a key opening, where the key opening consists of the insert key cavity and one of the plug key cavities, thereby preventing the plug from rotating within the insert.

17. The method of claim 16, where the insert is an insert that can be used on any vehicle wheel.

18. The method of claim 16, where the wheel cover is an aerodynamic wheel cover.

19. The method of claim 16, where the insert comprises PVC plastic.

\*   \*   \*   \*   \*